(12) United States Patent
Mo et al.

(10) Patent No.: US 8,385,342 B2
(45) Date of Patent: Feb. 26, 2013

(54) SYSTEM AND METHOD OF VIRTUAL PRIVATE NETWORK ROUTE TARGET FILTERING

(75) Inventors: Li Mo, Plano, TX (US); James H. Buchanan, Ottawa (CA); Robert T. Gibson, Ottawa (CA); Nimer Yaseen, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 1205 days.

(21) Appl. No.: 10/044,106

(22) Filed: Jan. 11, 2002

(65) Prior Publication Data

US 2002/0181477 A1 Dec. 5, 2002

Related U.S. Application Data

(60) Provisional application No. 60/294,755, filed on May 31, 2001.

(51) Int. Cl.
*H04L 12/28* (2006.01)

(52) U.S. Cl. .......................... 370/392; 370/401

(58) Field of Classification Search ................ 370/237, 370/238, 351, 352, 392, 400, 401, 254, 395.31
See application file for complete search history.

(56) References Cited

U.S. PATENT DOCUMENTS

| | | | |
|---|---|---|---|
| 5,793,763 A | 8/1998 | Mayes et al. | |
| 5,881,243 A | 3/1999 | Zaumen et al. | |
| 6,163,527 A | 12/2000 | Ester et al. | |
| 6,167,445 A | 12/2000 | Gai et al. | |
| 6,178,505 B1 | 1/2001 | Schneider et al. | |
| 6,226,748 B1 | 5/2001 | Bots et al. | |
| 6,226,751 B1 | 5/2001 | Arrow et al. | |
| 6,339,595 B1 | 1/2002 | Rekhter et al. | |
| 6,449,650 B1 | 9/2002 | Westfall et al. | |
| 6,526,056 B1 * | 2/2003 | Rekhter et al. | 370/392 |
| 6,539,483 B1 | 3/2003 | Harrison et al. | |
| 6,577,327 B1 | 6/2003 | Rochford et al. | |
| 6,625,773 B1 * | 9/2003 | Boivie et al. | 714/749 |
| 6,633,563 B1 * | 10/2003 | Lin et al. | 370/389 |
| 6,701,358 B1 | 3/2004 | Poisson et al. | |
| 6,751,729 B1 | 6/2004 | Giniger et al. | |
| 6,760,330 B2 | 7/2004 | Tahan | |
| 6,765,591 B2 | 7/2004 | Poisson et al. | |
| 6,871,233 B1 | 3/2005 | Bearden et al. | |
| 6,880,127 B1 | 4/2005 | Arquie | |
| 6,915,351 B2 * | 7/2005 | Tahan | 709/242 |
| 6,944,183 B1 | 9/2005 | Iyer et al. | |
| 7,096,495 B1 | 8/2006 | Warrier et al. | |
| 7,139,838 B1 * | 11/2006 | Squire et al. | 709/242 |
| 7,620,053 B2 * | 11/2009 | MeLampy et al. | 370/395.31 |
| 2003/0039212 A1 * | 2/2003 | Lloyd et al. | 370/235 |
| 2005/0025069 A1 * | 2/2005 | Aysan | 370/254 |
| 2009/0052457 A1 * | 2/2009 | Salama et al. | 370/392 |

OTHER PUBLICATIONS

World Wide Web, http://www.ietf.org/rfc/rfc2547.txt?number=2547, E. Rosen, et al., "BGP/MPLS VPNs," IETF, Mar. 1999, 24 pages.
Chuck Semeria, RFC 2547bis: BGP/MPLS VPN Hierarchical and Recursive Applications, Juniper Networks, Jul. 2001, 43 pages.
K. Muthukrishnan, A. Malis, RFC 2917, A Core MPLS IP VPN Architecture, Sep. 2000, pp. 1-15, IETF.

(Continued)

*Primary Examiner* — Hassan Phillips
*Assistant Examiner* — Saba Tsegaye
(74) *Attorney, Agent, or Firm* — Gardere Wynne Sewell LLP

(57) ABSTRACT

A system of route target filtering includes an import filter receiving a plurality of routes having a next hop routing information. The import filter accepts a first subset of the routes according to an import target policy. The system further includes a re-export filter also receiving the plurality of routes. The re-export filter modifies the next hop information of a second subset of the routes, and distributes the modified routes.

20 Claims, 1 Drawing Sheet

OTHER PUBLICATIONS

Danny Goderis et al., "Service Level Specification Semantics, Parameters and Negotiation Requirements" [online], Jun. 2001 [retrieved on Feb. 6, 2002]. Retrieved from the Internet:<URL: http://www.ietf.org/internet-drafts/draft-tequila-sls-01.txt>.

Cisco VPN Solutions Center: MPLS Solution User Guide. "Introduction to Cisco MPLS VPN Technology", Chapter 1, 2000, pp. 1-18.

Cisco VPN Solutions Center: MPLS Solution User Guide. "Getting Started with the MPLS VPN Solutions Center", Chapter 3, 2000, pp. 1-47.

MPLS VPN User Guide [online], 1989-2000 [retrieved on Feb. 8, 2002], Retrieved frrom the Internet< URL: http://www.cisco.com/univercd/td//doc/product/rtrmgmt/vpnsc/mpls/1_1/user_gd/>, 1 page.

"Part 3: Carrier sense multiple access with collision detection (CSMA/CD) access method and physical layer specifications", In: IEEE Std. 802.3, 2000 Edition, pp. 40-50.

Yates, Jennifer et al., "Reconfiguration in IP Over WDM Access Networks", AT&T Labs-Research, AT&T Shannon Laboratories, 4 pages.

Varadarajan, Suba et al., "Virtual Local Area Networks" [online], Aug. 14, 1997 [retrieved on Feb. 7, 2000]. Retrieved from the Internet: URL: http://www.cis.ohio-state.edu/~jain/cis788-97/virtual_lans/index.htm>, pp. 1-12.

Peter Aswood-Smith et al., "Generalized MPLS Signaling—RSVP-TE Extensions" [online], Nov. 2000 [retrieved on Feb. 16, 2007]. Retrieved from the Internet: URL: http://tools.ietf.org/html/draft-ietf-mpls-generalized-rsvp-te-04> pp. 1-21.

Eric C. Rosen et al., "Multiprotocol Label Switching Architecture" [online], Jul. 2000 [retrieved on Feb. 16, 2007]. Retrieved from the Internet: URL: <http://tools.ietf.org/html/draft-ietf-mpls-arch-07> pp. 1-61.

\* cited by examiner

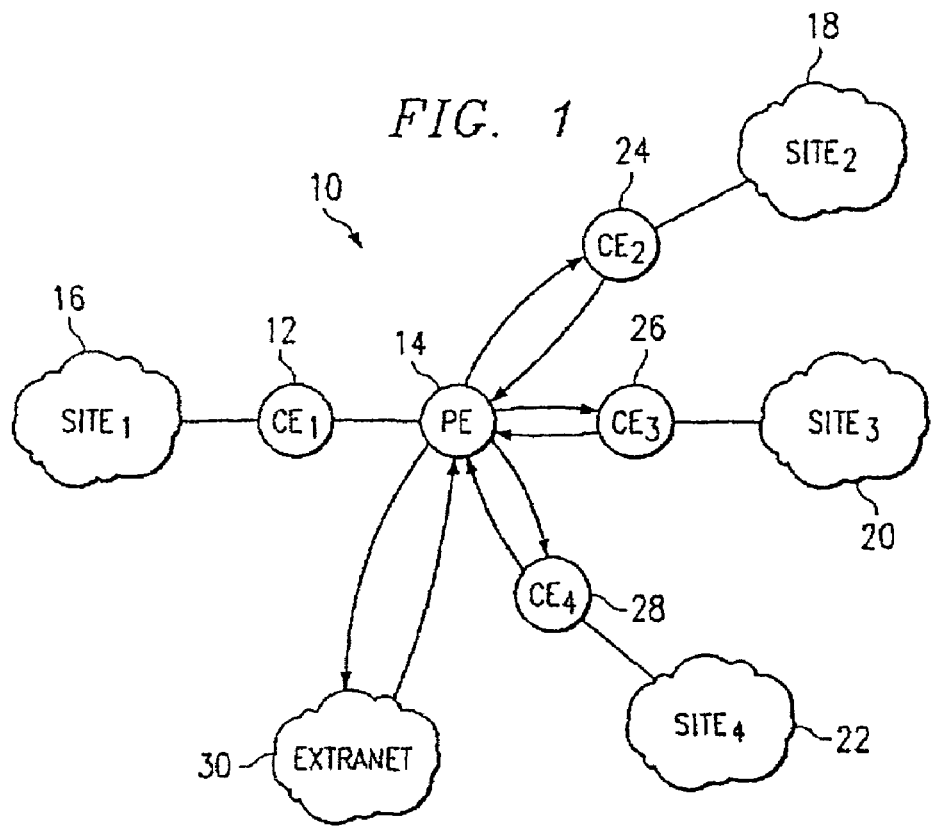
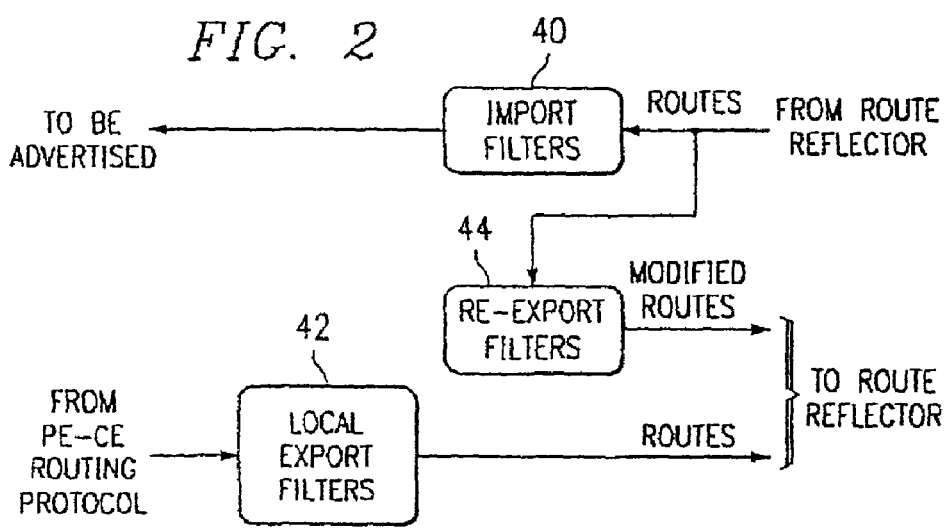

SYSTEM AND METHOD OF VIRTUAL PRIVATE NETWORK ROUTE TARGET FILTERING

RELATED APPLICATION

The present application claims priority to provisional application Ser. No. 60/294,755, filed on May 31, 2001, entitled "SYSTEM AND METHOD OF VIRTUAL PRIVATE NETWORK ROUTE TARGET FILTERING."

TECHNICAL FIELD OF THE INVENTION

This invention relates to telecommunications network and equipment, and more particularly, to a system and method of virtual private network route target filtering.

BACKGROUND OF THE INVENTION

Request for Comment (RFC) 2547 bis provides out a virtual private network (VPN) model that uses border gateway protocol (BGP) to distribute VPN routing information across the service provider's backbone and Multi-protocol label switching (MPLS) to forward VPN traffic from one VPN site to another. RFC 2547 bis defines a VPN as a collection of policies, and these policies control connectivity among a set of sites. A customer site is connected to the service provider network by one or more ports, where the service provider associates each port with a VPN routing table. RFC 2547 bis calls the VPN routing table as a VPN routing and forwarding (VRF) table. A customer edge (CE) device provides customer access to the service provider network over a data link to one or more provider edge (PE) routers. The CE device can be a host, a Layer 2 switch, or more commonly, an IP router that establishes an adjacency with its directly connected PE routers. After the adjacency is established, the CE router advertises the site's local VPN routes to the PE router and learns remote VPN routes from the PE router. After learning local VPN routes from CE routers, a PE router exchanges VPN routing information with other PE routers using IBGP.

A route distinguisher (RD) is an identifier that is used to differentiate IP addresses or IPv4 prefixes of a VPN from another because customers may not use globally unique IP addresses. RFC 2547 bis constrains the distribution of routing information among PE routers by the use of route filtering based on a route target (RT) attribute, which is one of the BGP extended community attributes. Route targets include import targets and export targets. The import target of a site governs which sites' route update information or advertisement it will accept; the export target of the site specifies what import target the sites it advertises to should include.

An enterprise's VPN may be configured in a hub-and-spoke topology where the firewall is the hub through which all traffic is routed. The hub site's VRF table is configured with an export target=hub and an import target=spoke. The VRF table at the hub site distributes all of the routes in its VRF table with a hub attribute that causes the routes to be imported by the spoke sites. The VRF table at the hub site imports all remote routes with a spoke attribute. The VRF table at each spoke site is configured with an export target=spoke and an import target=hub. The VRF table at each spoke site distributes its routes with a spoke attribute, which causes the routes to be imported by the hub site, but dropped by other spoke sites. The VRF table at a spoke site imports only routes with a hub attribute, which causes its VRF table to be populated only with routes advertised by the hub site.

In conventional VPNs, policy-based routing around the firewall in the huband-spoke topology requires either the knowledge of the IPv4 prefix or the use of at least two router ports in order to route packets to the spokes from the hub. The reliance using the IP address is tedious and labor intensive, and using an extra router port is inefficient and costly.

SUMMARY OF THE INVENTION

In accordance with an embodiment of the present invention, a system of route target filtering includes an import filter receiving a plurality of routes having a next hop routing information. The import filter accepts a first subset of the routes according to an import target policy. The system further includes a re-export filter also receiving the plurality of routes. The re-export filter modifies the next hop information of a second subset of the routes, and distributes the modified routes. If desired, the re-export filter may also, modify the RD and RT information of the second subset of the routes.

In accordance with another embodiment of the present invention, a network includes a hub node, and a plurality of spoke nodes in communications with one another via the hub node. The hub node includes an import filter receiving a plurality of routes. The plurality of routes each has a next hop routing information. The import filter accepts a first subset of the routes according to an import target policy. The network also includes a re-export filter receiving the plurality of routes. The re-export filter modifies the next hop information of a second subset of the routes, and distributes the modified routes. If desired, the re-export filter may also modify the LRD and RT information of the second subset of the routes.

In accordance with yet another embodiment of the present invention, a method includes the steps of receiving a plurality of routes each having a next hop routing information, accepting a first subset of the plurality of routes according to a predetermined policy, modifying the next hop information of a second subset of the plurality of routes, and distributing the modified routes.

The present invention uses re-export filters to modify the advertised routes and sends the modified routes to the route reflector for distribution. The routes of nodes within the VPN is modified to have the next hop information as designating the firewall node. The present invention thus provides a way to perform policy routing around a firewall for a VPN based on RFC 2547 bis without the disadvantages associated with the use of IP prefix knowledge or an extra port.

BRIEF DESCRIPTION OF THE DRAWINGS

For a more complete understanding of the present invention, the objects and advantages thereof, reference is now made to the following descriptions taken in connection with the accompanying drawings in which:

FIG. 1 is a simplified block diagram of a virtual private network (VPN) configured with a firewall according to the teachings of the present invention; and FIG. 2 is a simplified diagram of an embodiment of the route target filtering scheme according to the teachings of the present invention.

DETAILED DESCRIPTION OF THE DRAWINGS

The preferred embodiment of the present invention and its advantages are best understood by referring to FIGS. 1 and 2 of the drawings, like numerals being used for like and corresponding parts of the various drawings.

FIG. 1 is a simplified block diagram of a virtual private network (VPN) 10 configured in a hub-and-spoke configuration with a firewall as the hub 12 according to the teachings of the present invention. Hub 12 is a customer edge (CE) device of Site$_1$ 16, which is coupled to a provider edge (PE) device 14 of a provider's network. A site is defined by a Request for Comment (RFC) 2547bis as a collection of customer routers with IP connectivity. Virtual private network 10 is a set of sites, including Site$_1$ 16, Site$_2$ 18, Site$_3$ 20, and Site$_4$ 22. Provider edge device 14 may be directly or indirectly coupled to customer edge devices 24-28 of Site$_2$ 18, Site$_3$ 20; and Site$_4$ 22, respectively. Communication to and from an extranet 30 is done via customer edge device CE$_1$ 12, which is the firewall. According to the teachings of the present invention, this is done using a route target filtering scheme which does not have the disadvantages of conventional methods.

FIG. 2 is a simplified diagram of an embodiment of the route target filtering scheme according to the teachings of the present invention. The hub, CE$_1$ 12, receives routes from a route reflector (not shown), which is a centralized distributor of routes. The route information includes the route distinguisher (RD), route target (RT), and next hop (NH):

RouteInformation={RD,RT,NH}

Next hop information may include the provider edge external virtual private router IP address and the IfIndex. Other route information such as the site of origin, the VPN identifier and the IPv4 prefix may also be included in the route. A set of import filters 40 is used to determine which routes should be accepted and which routes should be rejected. Import filters 40 include a mask used to compare the route input to certain route information such as route target values. For example, the mask is used to indicate which route information field should be compared to the target value:

Mask{0|1,0|1,0|1},Value{*,*,*},
Action=accept|discard

If the mask is set or one for a specific field, then the corresponding value for that field is compared with the received route; if the mask is clear or zero for a specific field, then the corresponding value for that field is not compared. Upon a match between the route information and the compare value, the route is either rejected or accepted. The accepted routes are passed on for route advertisement.

The filtering scheme also includes export filters, local export filters 42 and reexport filters 44. Local export filters 42 perform port level-based VPN assignments. Local export filters 42 receive routes from the PE-CE routing protocol and apply at least one filter. The accepted routes are exported to the proper route reflector. Reexport filters 44 also receive routes from the route reflector as input. The accepted routes are modified with a different route distinguisher, route target, and next hop information and redistributed to the route reflector.

As an illustrative example, customer edge device, CE$_1$ 12, has import targets RT$_R$, RT$_S$ and RT$_T$. Its spokes, CE$_2$, CE$_3$ and CE$_4$, each respectively advertises export route targets RT$_R$, RT$_S$ and RT$_T$. Sites 16-22 belong to a VPN that is distinguished by route distinguisher RD$_1$, for example. Therefore, route information advertised by CE$_2$ to the hub, CE$_1$, for example is {RD, RT, NH}={RD$_1$, RT$_R$, CE$_2$}. Re-export filter, upon receiving this route, modifies the route to be {RD, RT, NH}={RD$_2$, RT$_x$, CE$_1$}, for example. One or more sites in extranet 30 may import routes with RTx as the route target. It is led to believe that to communicate with site 18 would require it to communicate with CE$_1$ 12 because CE$_1$ is designated as the next hop in the route information. A different route distinguisher, RD$_2$, is attached to the modified route in order to avoid duplication in the route reflector.

In this manner, routes to sites within a VPN are advertised with the firewall node as the next hop, so that all communications are routed via the firewall. The present invention does not require the manipulation of the IPv4 prefix or the use of an extra router port at the provider edge device to route data to sites within the VPN and outside the VPN. This saves the labor intensive and tedious management and manipulation of the IPv4 prefix and the costs associated with the extra router port. As IP addresses are constantly changing, independence therefrom also provides added benefits. The present invention may be applicable to other situations where redirected routes are needed.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A system for filtering and distributing routes to sites in a virtual private network, the routes being used by a router to forward packets, comprising:
    an import filter receiving a plurality of routes from a route distributor, the plurality of routes having a route distinguisher, a route target, and a next hop routing information, the import filter accepting a first subset of the routes according to an import target policy; and
    a re-export filter receiving the plurality of routes from the route distributor, the re-export filter modifying the next hop information of a second subset of the routes, and distributing the modified routes.

2. The system as set forth in claim 1, wherein the re-export filter modifies the next hop information to be the address of a router serving as a firewall of a network.

3. The system, as set forth in claim 1, wherein the re-export filter modifies the next hop information to be the address of a firewall of a virtual private network.

4. The system, as set forth in claim 1, wherein the re-export filter comprises a mask, a value for comparison with the route, and an action to take in response to a match between the route and the comparison value.

5. The system as set forth in claim 1, wherein the re-export filter modifies the route distinguisher and the route target, and distributes the modified routes.

6. A network, comprising:
    a hub node;
    a plurality of spoke nodes in communications with one another via the hub node; and the hub node including:
    an import filter receiving a plurality of routes from a route distributor, the routes being used by a router to forward packets, the plurality of routes having a route distinguisher, a route target, and a next hop routing information, the import filter accepting a first subset of the routes according to an import target policy; and
    a re-export filter receiving the plurality of routes from the route distributor, the re-export filter modifying the next hop information of a second subset of the routes, and distributing the modified routes.

7. The network, as set forth in claim 6, wherein the re-export filter modifies the next hop information to be the address of the hub node.

8. The network, as set forth in claim 6, wherein the re-export filter modifies the next hop information to be the address of the hub node serving as a firewall for the network.

9. The network, as set forth in claim 6, wherein the re-export filter modifies the next hop information to be the address of the hub serving as a firewall of a virtual private network.

10. The network, as set forth in claim 6, wherein the re-export filter comprises a mask, a value for comparison with the route, and an action to take in response to a match between the route and the comparison value.

11. The network, as set forth in claim 6, wherein the hub node is a customer edge device coupling a site to a provider network.

12. The network as set forth in claim 6, wherein the re-export filter modifies the route distinguisher and the route target, and distributes the modified routes.

13. A method for filtering and distributing routes to sites in a virtual private network, the routes being used by a router to forward packets, comprising:
   receiving a plurality of routes for the virtual private network, each route having a route distinguisher, a route target, and a next hop routing information;
   accepting a first subset of the plurality of routes according to a predetermined policy;
   modifying the next hop information of a second subset of the plurality of routes; and
   distributing the modified routes to at least one other site in the virtual private network;
   wherein modifying the next hop information of the second subset of the plurality of routes includes using a re-export filter.

14. The method, as set forth in claim 13, wherein modifying the next hop information comprises modifying the next hop information to be the address of a router serving as a firewall of a network.

15. The method, as set forth in claim 13, wherein modifying the next hop information comprises modifying the next hop information to be the address of a firewall of the virtual private network.

16. The method, as set forth in claim 13, wherein, the re-export filter comprises a mask, a value for comparison with the route, and an action to take in response to a match between the route and the comparison value.

17. The method as set forth in claim 13, wherein the re-export filter modifying the route distinguisher and the route target, and distributes the modified routes.

18. The method of claim 13, wherein accepting the first subset of the plurality of routes according to a predetermined policy is based on the route target contained in each of the plurality of routes.

19. The method of claim 13, further comprising modifying the route distinguisher of the second subset of the plurality of routes.

20. The method of claim 13, wherein a customer edge router receives the plurality of routes, accepts the first subset of the first plurality of routes, modifies the first hop information of the second subset of the plurality of routes, and distributes.

* * * * *

UNITED STATES PATENT AND TRADEMARK OFFICE
CERTIFICATE OF CORRECTION

PATENT NO. : 8,385,342 B2
APPLICATION NO. : 10/044106
DATED : February 26, 2013
INVENTOR(S) : Li Mo et al.

Page 1 of 1

It is certified that error appears in the above-identified patent and that said Letters Patent is hereby corrected as shown below:

In the Specification:

At column 2, line number 32, please replace [LRD] with -- RD --.

Signed and Sealed this
Ninth Day of April, 2013

Teresa Stanek Rea
*Acting Director of the United States Patent and Trademark Office*